Jan. 27, 1948. W. H. TREXLER 2,435,186
PNEUMATIC TIRE FOR MODEL AEROPLANES AND THE LIKE
Filed Oct. 19, 1942
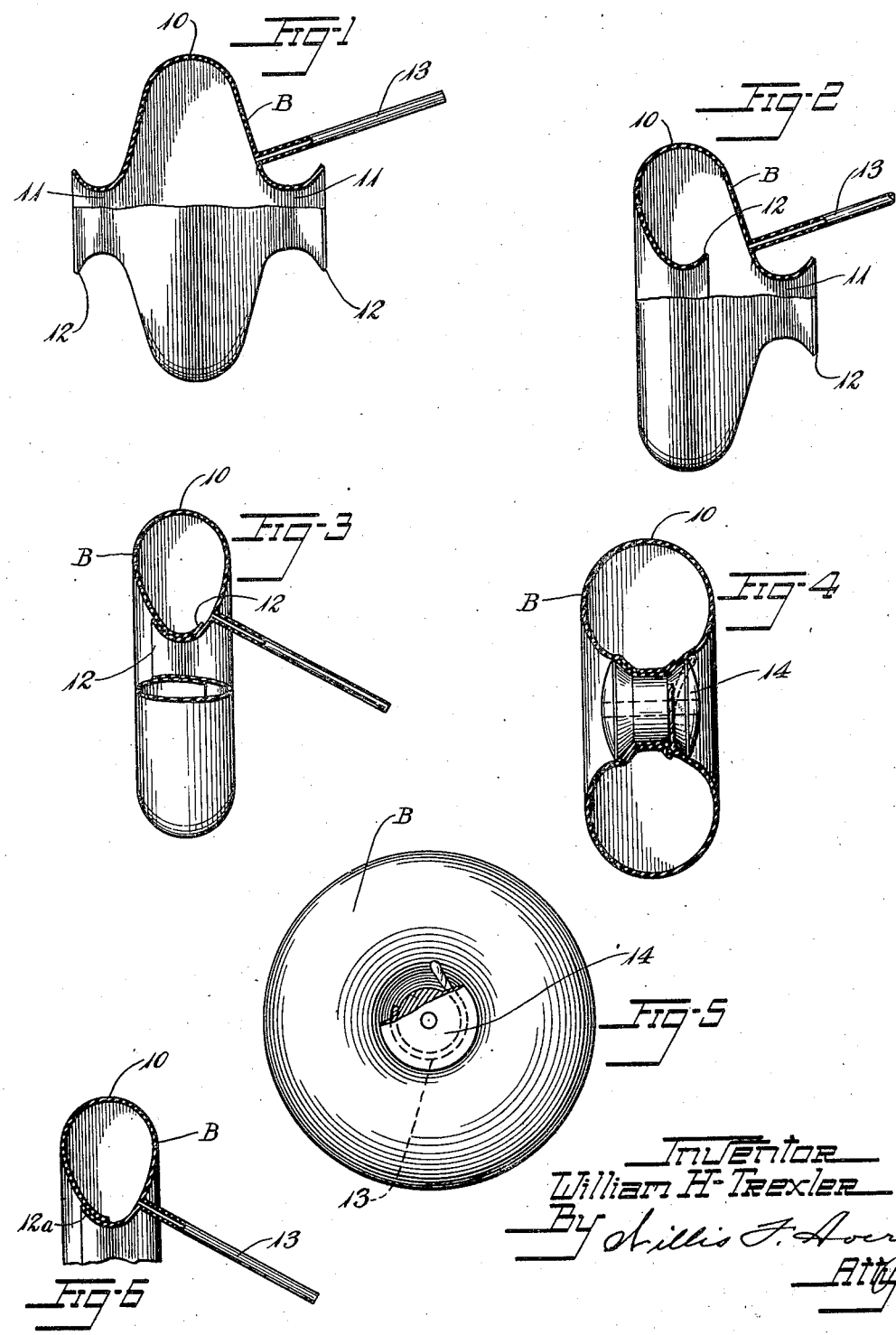

Patented Jan. 27, 1948

2,435,186

UNITED STATES PATENT OFFICE 2,435,186

PNEUMATIC TIRE FOR MODEL AEROPLANES AND THE LIKE

William H. Trexler, Ravenna, Ohio

Application October 19, 1942, Serial No. 462,595

13 Claims. (Cl. 152—330)

This invention relates to pneumatic tires and particularly to a light-weight single-tube inflatable tire especially adapted for model aeroplanes, toys, and similar light-weight wheeled objects.

In my U. S. Patent No. 2,206,438, granted July 2, 1940, I have described and claimed a novel tire and method of making the same in a simple manner. According to the method of that patent, I form a bulbous rubber body provided with oppositely extending tubular stems, then telescope one of the stems within the other, cement the two stems together and roll them to form a compact seam and thus close the central portion of the body to produce an annular inflatable tire.

I have now discovered that the steps of cementing and rolling the stems may be eliminated entirely and that the inner circumference of the tire may be formed by flaps having only frictional engagement with each other. Such elimination of the cementing and rolling steps greatly simplifies manufacture of the tire by avoiding tedious hand-work with resultant substantial savings in cost, and at the same time produces a simpler tire which may be mounted, demounted, and repaired with greater facility.

The invention will be described with reference to the accompanying drawing of which:

Fig. 1 is an elevational view of a preferred form of rubber body from which the present tire is formed, the body being partially broken away and sectioned for clarity of illustration.

Fig. 2 is a similar view showing the body of Fig. 1 after one of the tubular extensions has been turned inward.

Fig. 3 is a similar view of the same body after the second tubular extension has been turned inward and telescoped within the first extension to complete the tire.

Fig. 4 is a similar view showing the tire of Fig. 3 mounted on a wheel or hub and inflated.

Fig. 5 is a side elevational view of the mounted tire of Fig. 4.

Fig. 6 is a fragmentary elevational view of a tire embodying the invention in a modified form, portions of the tire again being broken away and sectioned for clarity of illustration.

The tire of the present invention preferably comprises a one-piece unitary rubber body B formed or molded in any well-known manner but preferably by dipping a suitable deposition form in latex and thereafter drying and vulcanizing the rubber deposit in the manner described in my above-mentioned patent. Any natural or synthetic rubbery material having the requisite qualities of resiliency and elasticity may be utilized in forming the body.

In a preferred embodiment, the one-piece rubber body as initially formed should have substantially the configuration shown in Fig. 1. Thus, the body B preferably should comprise a circular bulbous portion 10 loop-shaped in transverse section and having an outer circumferential configuration conforming generally to the outer circumferential configuration of the desired tire, the body having opposed central apertures, as indicated at 11—11, of such size as to embrace closely a wheel or rim on which the tire is to be mounted. Tubular extensions 12—12 preferably should be provided about each of the apertures 11—11 in outwardly projection disposition, both the tubular extensions desirably being sharply flared with gently curved contours to conform substantially to the inner circumferential configuration of the desired tire. Also, a small flexible rubber inflating tube 13 preferably is provided extending outwardy from the bulbous body at a position adjacent one of the apertures 11, the inflating tube 13 preferably having a substantial length adapted to extend around a considerable portion of the circumference of the wheel or rim on which the tire is mounted. As previously indicated, all the foregoing elements preferably comprise a single one-piece unitary body of rubbery material usually having walls of substantially the same thickness throughout.

To complete the tire, one of the tubular extensions 12, usually the one opposite the inflating tube 13, is first turned inside the body 10, or invaginated, as shown in Fig. 2. Then, the other extension 12 is likewise invaginated and telescoped through the first extension as shown in Fig. 3. As may be appreciated from the drawing, these operations serve to form an inner circumference for the tire, the two tubular extensions froming flap-like elements lying in overlapping relation and snugly embracing each other by reason of their curvature and the stresses set up in the members by the reversals.

The completed tire is then mounted on any suitable flanged wheel or rim support such as the flanged wooden hub 14. The tire is then inflated as by blowing through the inflating tube 13 after which the tube preferably is twisted and wrapped about the hub between the flange and the tire as shown in Figs. 4 and 5, this operation being facilitated by pushing the tire back from the flange. Inflation pressure in the tire serves to compress the twisted inflating tube between the tire and the flange and also to urge the overlapped flaps 12—12 into tight frictional sealing engagement. Such frictional sealing engagement of the flaps 12 without the use of any adhesive and the compressive clamping of the inflating tube have been found entirely adequate to maintain sufficient air pressure in the tire over long periods of time.

Adequate sealing at the inner circumference of the tire may also be obtained if only one tubular extension or flap is provided on the main body B, the single flap 12a in such modified embodiment engaging the wall of the bulbous portion 10 in the region adjacent the aperture as shown in Fig. 6. In this modified embodiment of the invention, the main body B, of course, will be formed with one tubular extension instead of two as shown in Fig. 1, the appearance being the same as if one of the two extensions 12—12 of Fig. 1 had simply been cut off flush with the wall of the bulbous portion 10.

Although an adhesive is not required to form a tight seal between the overlapped flap portions, it should be understood that such use of adhesive is not absolutely prohibited and in some instances may be desirable.

While the invention is particularly useful in the manufacture of very light-weight tires for model aeroplanes where the tire and hub assembly frequently may weigh as little as ½ ounce, it should be understood that the principles of the invention may be utilized in providing tires for other applications. Likewise, numerous other modifications and variations in details of the invention as hereinabove described may be effected without departing from the spirit and scope of the invention as defined by the appended claims.

I claim:

1. An article of manufacture adapted to form a single-tube pneumatic tire and comprising a one-piece hollow body having flexible walls of rubbery material; said body including a circular bulbous portion having an outer circumferential configuration conforming generally to the outer circumferential configuration of the desired tire and having opposed apertures substantially at the center of the bulbous portion, and a tubular extension projecting outwardly about at least one of said apertures, the wall of said extension being formed of freely extensible rubbery material and being readily bendable from the outwardly projecting position to an inwardly projecting position so that the said extension may be reversed and turned inward through both said apertures to form the inner circumference of the tire, said extension having a sharply flared, curving, configuration adapted, when reversed, to embrace snugly an opposed curved portion of said body in overlapping but freely slidable relation and to form a seal therewith, upon inflation, solely by resilient pressure of one of said overlapped members against the other.

2. An article of manufacture adapted to form a single-tube pneumatic tire and comprising a one-piece hollow body having flexible walls of rubbery material; said body including a circular bulbous portion having an outer circumferential configuration conforming generally to the outer circumferential configuration of the desired tire and having opposed apertures substantially at the center of the bulbous portion, a tubular extension projecting outwardly about at least one of said apertures, the wall of said extension being formed of freely extensible rubbery material and being readily bendable from the outwardly projecting position to an inwardly projecting position so that the said extension may be reversed and turned inward through both said apertures to form the inner circumference of the tire, said extension having a sharply flared, curving, configuration adapted, when reversed, to embrace snugly an opposed curved portion of said body in overlapping but freely slidable relation and to form a seal therewith, upon inflation, solely by resilient pressure of one of said overlapped members against the other and an inflating tube extending from the hollow body at a position adjacent one of said apertures.

3. An article of manufacture adapted to form a single-tube pneumatic tire and comprising a one-piece hollow body having flexible walls of rubbery material; said body including a circular bulbous portion having an outer circumferential configuration conforming generally to the outer circumferential configuration of the desired tire and having opposed apertures substantially at the center of the bulbous portion, and a tubular extension projecting outwardly about each of said apertures, the walls of said extensions being formed of freely extensible rubbery material and being readily bendable from the outwardly projecting positions to inwardly projecting positions so that the said extensions may be turned inward and telescoped one through the other to form the inner circumference of the tire, said extensions having sharply flared, curving, configurations and being similarly positioned with respect to the normal axis of rotation of the tire so as, when reversed and telescoped together, to lie in overlapping relation and, upon inflation, to form a seal therebetween solely by resilient pressure of one of said extensions against the other.

4. An article of manufacture adapted to form a single-tube pneumatic tire and comprising a one-piece hollow body having flexible walls of rubbery material; said body including a circular bulbous portion having an outer circumferential configuration conforming generally to the outer circumferential configuration of the desired tire and having opposed apertures substantially at the center of the bulbous portion; a tubular extension projecting outwardly about each of said apertures; the walls of said extensions being formed of freely extensible rubbery material and being readily bendable from the outwardly projecting positions to inwardly projecting positions so that the said extensions may be turned inward and telescoped one through the other to form the inner circumference of the tire; said extensions having sharply flared, curving, configurations and being similarly positioned with respect to the normal axis of rotation of the tire so as, when reversed and telescoped together, to lie in overlapping relation and, upon inflation, to form a seal therebetween solely by resilient pressure of one of said extensions against the other and an inflating tube extending from the hollow body at a position adjacent one of said apertures.

5. A pneumatic tire adapted to be mounted on a hub or rim support and comprising a one-piece hollow body having throughout its extent flexible walls of freely extensible rubbery material; said body including a circular bulbous portion constituting the tire proper and having opposed central apertures adapted to receive the support, a tubular flap portion extending about one of said apertures and being engaged frictionally but not otherwise with the wall of the bulbous portion about the opposed aperture, and means for introducing an inflating medium into the tire, the said tubular flap portion having a sharply flared, curving, configuration normally extending outwardly from the bulbous portion but being reversed to bring it into overlapping and freely slidable contact with said wall of the bulbous portion.

6. A pneumatic tire adapted to be mounted on a hub or rim support and comprising a one-piece hollow body having throughout its extent flexible walls of freely extensible rubbery material; said body including a circular bulbous portion constituting the tire proper and having opposed central apertures adapted to receive the support, tubular flap portions extending inwardly about each of said apertures, the two flap portions being telescoped together and being mutually engaged frictionally but not otherwise, and means for introducing an inflating medium into the tire, the said tubular flap portions each having substantially the same sharply flared, curving, configuration normally extending outwardly from the bulbous portion but being reversed to bring them into overlapping and freely slidable contact with each other.

7. A pneumatic tire adapted to be mounted on a hub or rim support and comprising a one-piece hollow body having throughout its extent flexible walls of freely extensible rubbery material; said body including a circular bulbous portion constituting the tire proper and having opposed central apertures adapted to receive the support, a tubular flap portion extending about one of said apertures and being engaged frictionally but not otherwise with the wall of the bulbous portion about the opposed aperture, the said tubular flap portion having a sharply flared curving configuration normally extending outwardly from the bulbous portion and being reversed to bring it into overlapping and freely slidable contact with the said wall of the bulbous portion conforming snugly to the configuration of the inner circumference of the tire and engaging closely with the said wall of the bulbous portion, and means for introducing an inflating medium into the tire.

8. A pneumatic tire adapted to be mounted on a hub or rim support and comprising a one-piece hollow body having throughout its extent flexible walls of freely extensible rubbery material; said body including a circular bulbous portion constituting the tire proper and having opposed central apertures adapted to receive the support, tubular flap portions extending inwardly about each of said apertures, the two flap portions being telescoped together and being mutually engaged frictionally but not otherwise, the said tubular flap portions each having substantially the same sharply flared, curving configuration normally extending outwardly from the bulbous portion but being reversed to bring said flap portions into overlapping and freely slidable contact with each other to form a curved inner circumference for the tire, and means for introducing an inflating medium into the tire.

9. In a pneumatic tire assembly comprising a flanged rim or wheel support and an inflated tire mounted thereon, a tire comprising a hollow body having walls of freely extensible rubbery material, the said body including a bulbous portion constituting the tire proper and having opposed central apertures embracing the support, the said body also including a tubular flap portion extending inwardly about one of said apertures and frictionally but not otherwise engaging in overlapping relation the wall of the bulbous portion about the opposite aperture and in a zone backed by the said support, the said flap portion thus forming the inner circumference of the tire and being urged into effective sealing engagement with the opposed wall portion by inflation compression against the support, the said tubular flap portion having a sharply flared, curving, configuration and being so related to the opposed wall portion engaged thereby as to effect sealing engagement therewith by resilient pressure of the one against the other, the flap being in freely slidable relation with said opposed wall portion.

10. In a pneumatic tire assembly comprising a flanged rim or wheel support and an inflated tire mounted thereon, a tire comprising a hollow body having walls of freely extensible rubbery material, the said body including a bulbous portion constituting the tire proper and having opposed central apertures embracing the support, the said body also including tubular flap portions extending inwardly about each of said apertures and being telescoped together to form the inner circumference of the tire, the telescoped flaps being mutually engaged frictionally but not otherwise and being urged into effective sealing engagement by inflation compression against the support, the said tubular flap portions each having substantially the same sharply flared, curving, configuration so that, after being reversed and telescoped together, sealing engagement is effected therebetween by resilient pressure of one against the other, the said flap portions being in freely slidable relation.

11. In a pneumatic tire assembly comprising a flanged rim or wheel support and an inflated tire mounted thereon and being especially adapted for light-weight objects such as model aeroplanes, toys, and the like; a tire comprising a one-piece hollow body having walls of freely extensible rubbery material of substantially the same thickness throughout its extent, the said body including a bulbous portion constituting the tire proper and having opposed central apertures embracing the support, a tubular flap portion of sharply flared, curving configuration extending inwardly from one of said apertures and frictionally but not otherwise engaging the wall of the bulbous portion about the opposite aperture the said flap and said wall portion being in freely slidable relation, the said flap portion thus forming the inner circumference of the tire and being urged into effective sealing engagement with the opposed wall portion by inflation compression against the support, and an inflating tube extending from the hollow body adjacent one of said apertures and being clamped by inflation pressure between the tire body and the flanged support.

12. In a pneumatic tire assembly comprising a flanged rim or wheel support and an inflated tire mounted thereon and being especially adapted for light-weight objects such as model areoplanes, toys, and the like; a tire comprising a one-piece hollow body having walls of freely extensible rubbery material of substantially the same thickness throughout its extent, the said body including a bulbous portion constituting the tire proper and having opposed central apertures embracing the support, two tubular flap portions each having sharply flared, curving, configurations of substantially the same size and relative disposition extending inwardly respectively from each of said apertures and being telescoped together to form the inner circumference of the tire, the telescoped flaps being mutually engaged frictionally but not otherwise and being urged into effective sealing engagement by inflation compression against the support, the said flaps being in freely slidable relation and an inflating tube extending from the hollow body adjacent one of said apertures and being clamped by inflation pressure between the tire body and the flanged support.

13. An article of manufacture adapted to form a pneumatic tire comprising a continuously annular hollow body having a wall of resilient rubbery material, said wall in central cross-section transversely of the tire comprising a loop-shaped portion outwardly curved with respect to the normal axis of rotation of the tire terminating on either side thereof in opposed portions inwardly curved with respect to said axis of rotation substantially equidistant from said axis of rotation and being formed wholly of said resilient rubbery material for facilitating infolding said wall at each said inwardly curved portion and for facilitating disposing the latter portions in overlapping relation to one another at the inner circumference of said body and in substantially free sliding relation to one another, one of said inwardly curved portions resiliently pressing against the other by virtue of the stressed condition of said material when said portions are infolded in said overlapping relation, for effecting sealing action therebetween.

WILLIAM H. TREXLER.

REFERENCES CITED

The following references are of record in the file of this patent:

UNITED STATES PATENTS

| Number | Name | Date |
|---|---|---|
| 516,790 | Lavender | Mar. 20, 1894 |
| 553,566 | Perry | Jan. 28, 1896 |
| 608,188 | Doughty | Aug. 2, 1898 |
| 611,584 | Trench | Sept. 27, 1898 |
| 707,538 | Baker | Aug. 26, 1902 |
| 736,414 | Litchfield | Aug. 18, 1903 |
| 1,412,535 | Martin | Apr. 11, 1922 |
| 2,206,438 | Trexler | July 2, 1940 |

FOREIGN PATENTS

| Number | Country | Date |
|---|---|---|
| 2,782 | Great Britain | 1892 |